US 008029668B2

(12) United States Patent
Stacy et al.

(10) Patent No.: US 8,029,668 B2
(45) Date of Patent: Oct. 4, 2011

(54) FLUID TREATMENT DEVICE AND METHOD

(75) Inventors: Melvin O. Stacy, Baton Rouge, LA (US); Mark G. Arceneaux, Carencro, LA (US); Eric Wingate, Church Point, LA (US)

(73) Assignee: CCS Energy Services, LLC, Lafayette, LA (US)

( * ) Notice: Subject to any disclaimer, the term of this patent is extended or adjusted under 35 U.S.C. 154(b) by 1412 days.

(21) Appl. No.: 11/490,380

(22) Filed: Jul. 20, 2006

(65) Prior Publication Data
US 2008/0017582 A1 Jan. 24, 2008

(51) Int. Cl.
*C02F 1/24* (2006.01)
(52) U.S. Cl. ............... 210/221.1; 210/178; 210/180; 210/188; 210/195.1; 210/197; 210/205
(58) Field of Classification Search .......... 210/221.1, 210/221.2, 178, 179, 180, 188, 195.1, 197, 210/205
See application file for complete search history.

(56) References Cited

U.S. PATENT DOCUMENTS

| 2,730,190 | A | * | 1/1956 | Brown et al. | 95/253 |
| 2,730,240 | A | * | 1/1956 | Johnson | 208/188 |
| 3,647,069 | A | * | 3/1972 | Bailey | 210/703 |
| 3,993,563 | A | * | 11/1976 | Degner | 210/221.1 |
| 6,955,763 | B2 | | 10/2005 | Stacy et al. | |
| 2006/0169644 | A1 | * | 8/2006 | Chen et al. | 210/703 |

FOREIGN PATENT DOCUMENTS
GB 2114469 A * 8/1983
* cited by examiner

*Primary Examiner* — Thomas M Lithgow
(74) *Attorney, Agent, or Firm* — Jones Walker

(57) ABSTRACT

An apparatus and method for treating raw water. The apparatus comprises a vessel having an inlet for the raw water and an outlet for the skimmed water, and wherein the vessel contains the raw water, and a rotor mechanism for creating a plurality of gas bubbles within the raw water. The apparatus further comprises a disperser device, operatively associated with the rotor mechanism, for dispersing the plurality of gas bubbles from the rotor mechanism within the vessel, and wherein the gas bubbles create an oily froth on the top of the raw water, and a skim tray, positioned about the rotor mechanism, is provided for removing the oily froth from the top of the raw water as well as a secondary skimmer positioned within the skim tray. In one preferred embodiment, an external skim tank that is configured to deliver a gas to the rotor mechanism and wherein the external skim tank is configured to receive the oily froth from the secondary skimmer.

8 Claims, 6 Drawing Sheets

FLUID TREATMENT DEVICE AND METHOD

BACKGROUND OF THE INVENTION

This invention relates to a fluid treatment device and method. More particularly, but not by way of limitation, this invention relates to an apparatus and method to recover hydrocarbons from fluid streams.

In the course of producing and refining hydrocarbons, operators produce fluid streams that contain impurities. As those of ordinary skill in the art will recognize, produced streams contain hydrocarbons that require separation. Many times, an operator may wish to discharge the produced stream into a body of water, or inject the produced water into predetermined subterranean zones. Government regulations address the content of the discharge fluid streams. Also, operators do not wish to be the cause of pollution. Therefore, various types of prior art separation devices have been developed. However, prior art devices suffer from several deficiencies. For instance, in order to adequately separate the water from the hydrocarbons, large pieces of equipment are required. A large foot print (area occupied by the separation equipment) is needed. However, many times hydrocarbons are produced and/or refined in remote areas where space is a premium.

Hence, there is a need for a device and method that will effectively and efficiently separate hydrocarbons and other impurities from an effluent. There is also a need for a device and method that can be used with various types of fluid streams. Also, there is a need for a device that can be used in conjunction with other type of prior art separation devices. There is also a need for a device and method that creates a small foot print. These and many other needs will be met by the following disclosure.

SUMMARY OF THE INVENTION

An apparatus for treating a raw water is disclosed. The apparatus comprises a vessel having an inlet for the raw water and an outlet for the skimmed water, and wherein the vessel contains the raw water, and a rotor mechanism for creating a plurality of gas bubbles within the raw water. The apparatus further comprises a disperser means, operatively associated with the rotor mechanism, for dispersing the plurality of gas bubbles from the rotor mechanism within the vessel, and wherein the gas bubbles create an oily froth on the top of the raw water, and a skimming means, positioned about the rotor mechanism, for removing the oily froth from the top of the raw water.

In one preferred embodiment, the apparatus further comprises an external skim tank that is configured to deliver a gas to the rotor mechanism and wherein the external skim tank is configured to receive the oily froth and gas from the skimming means.

The apparatus may also contain a pump and centrifuge for separating a hydrocarbon component and a water component from the oily froth within the external skim tank, and wherein the water component from the centrifugal pump is directed to the vessel. A heat exchange method may also be included that is operatively associated with either the external skim tank or the primary process vessel so that heat is added to the oily froth or the process stream.

The disperser means, in one preferred embodiment, comprises a disperser mechanism concentrically disposed about the rotor mechanism, and a draft tube assembly operatively connected to the disperser mechanism, wherein the draft tube assembly provides a path for the raw water into the disperser mechanism.

In the most preferred embodiment, the skimming means includes an aeration skim tray positioned above the rotor mechanism. The skimming means may also include a secondary oil skimming device positioned within the aeration skim tray and configured to direct the oily froth from the vessel. In one preferred embodiment, the secondary oil skimming device comprises a cylindrical member with notches at a top end and wherein the oily froth is directed over the notches and into an internal portion of the cylindrical member. The rotor mechanism may include a shaft concentrically disposed within a standing pipe, wherein the standing pipe is attached to the internal portion of the vessel.

In yet another preferred embodiment, an apparatus for treating a raw water is disclosed. The apparatus includes a vessel having an inlet for the raw water and an outlet for the skimmed water, a rotor mechanism for creating a plurality of gas bubbles within the raw water and a disperser means, operatively associated with the rotor mechanism, for dispersing the plurality of gas bubbles from the rotor mechanism. In this embodiment, a skimming means, positioned about the rotor mechanism, for removing an oily froth from the top of the raw water is also included. The apparatus further includes an external skim tank that is configured to deliver a gas to the rotor mechanism and wherein the external skim tank is configured to receive the oily froth and gas from the skimming means. The apparatus further includes a closed loop gas line for communicating a gas from the external skim tank to the vessel.

A method of treating a raw water is also disclosed. The method comprises flowing the raw water into a treatment device. The treatment device includes a vessel containing the raw water, a rotor for creating a plurality of gas bubbles in the raw water, a disperser operatively associated with the rotor for dispersing the plurality of gas bubbles from the rotor, an internal skim tray for removing an oily froth from the top of the raw water within the vessel, an external skim tank configured to deliver a gas to the rotor and wherein the external skim tank is configured to receive the oily froth from the internal skim tray, and a closed loop gas line for communicating a gas from the external skim tank to the vessel.

The method further comprises channeling the raw water through a draft tube into the rotor, creating a plurality of bubbles within the raw water, and directing the raw water through the disperser in order to disperse the gas bubbles. The method further includes producing an oily froth on a top surface of the raw water, collecting the oily froth in the internal skim tray, and skimming the oily froth from the skim tray into a secondary skimming device.

The method further comprises channeling the oily froth through an output line to the external skim tank and exiting the skimmed water from the vessel. The method may include treating the process stream with carbon dioxide within the external skim tank. It should be noted that the step of treating the oily froth may consist of heating the oily froth within the external skim tank.

In one preferred embodiment, the method also includes directing the oily froth from the external skim tank to a pump and centrifuge, separating the oily froth into an oily component and a water component, and then channeling the water component back into the vessel.

Additionally, in one preferred embodiment, the step of creating the bubbles includes communicating a gas from the external skim tank to the vessel via a closed loop gas line. The method may further comprise directing the gas in the vessel back into the external skim tank via the output line so that the output line is cleaned.

An advantage is that the present disclosure combines components of several novel separation techniques into a single cell apparatus. Another advantage is that the invention provides for a smaller footprint of equipment, which is particularly valuable in remote and/or exotic locations.

Yet another advantage is the ability to recover oil from primary induced gas flotation machine rejects and hydrocyclone rejects. Still yet another advantage is the recovery of oil from produced water streams on a temporary basis while primary water treating equipment is either being serviced or is too large to be economically operated on the early production flow rates of the production facilities.

A feature of the present disclosure is a rotor mechanism for creating a plurality of bubbles within the flotation process. Another feature is a disperser for dispersing the bubbles. Yet another feature is the aeration skim tray for skimming the oily froth from the top of the effluent. Still yet another feature is the secondary oil skimming device, operatively associated with the aeration internal skim tray, for directing the oily froth from the vessel.

Yet another feature is the ability to introduce carbon dioxide make-up gas into the closed circulation gas eductor loop for the purpose of lowering the Ph of the produced water which will result in removing water soluble organic (WSO) content from the produced water. In other words, carbon dioxide or other acid gas source is delivered to the rotor mechanism either via the external skim tank or directly to the atmospheric space of the vessel for purpose of lowering the pH of the raw water and releasing water soluble organic content from the raw water and removing the organic content from the raw water by the flotation process.

Another feature is the ability to return the effluent water from the external skim tank to (1) the inlet of the vessel or (2) with the addition of subsequent filtration, discharge the water overboard within acceptable government regulations and industry standards. Put another way, the process includes subsequent, additional separation device(s) to clean the skimmed water for overboard or other suitable disposal means.

DETAILED DESCRIPTION OF THE PREFERRED EMBODIMENTS

Figure 1:
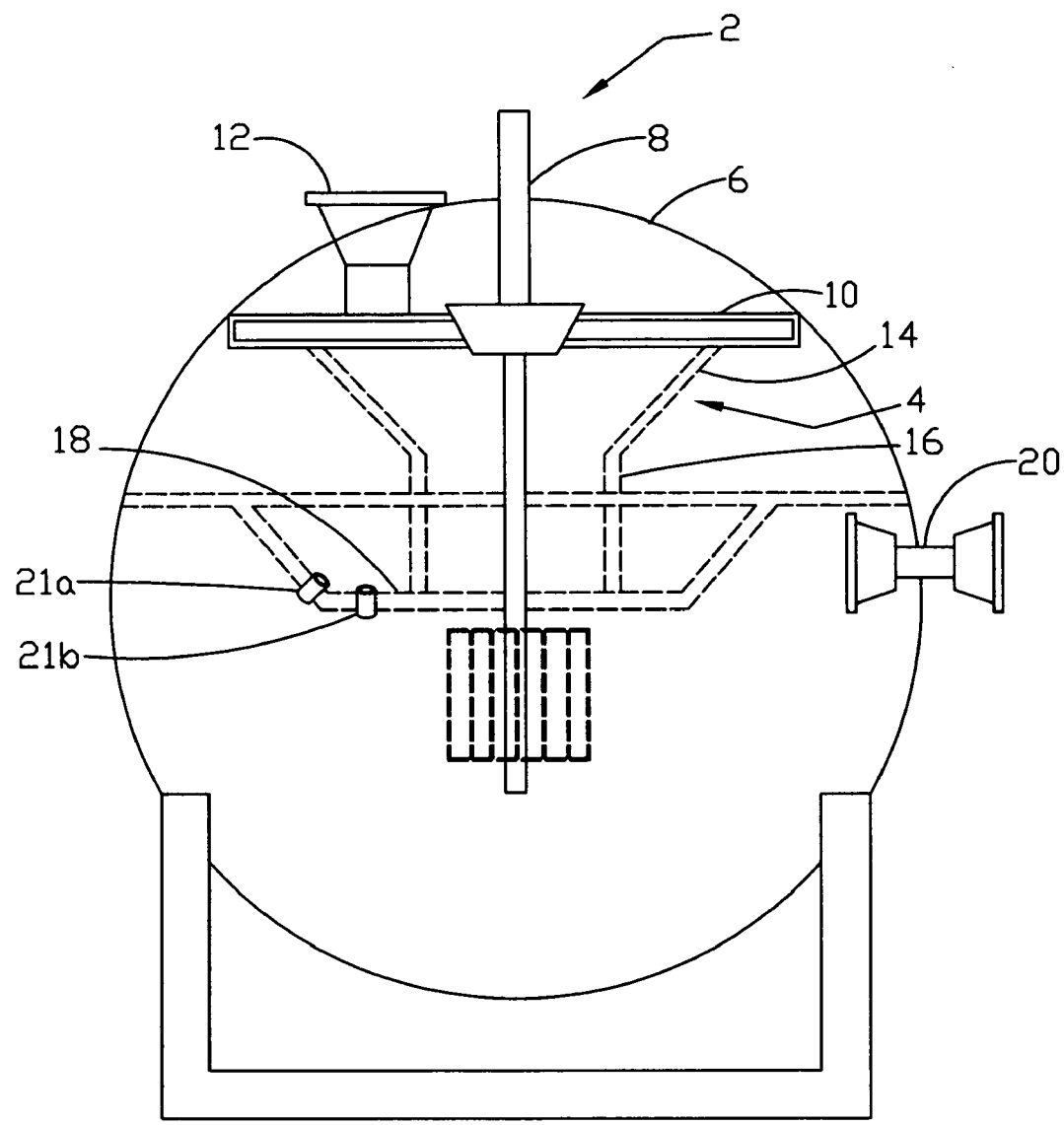
FIG. 1 is a partial cross-section end view of the rotor assembly, stand-pipe, and internal skim tray within the vessel of the most preferred embodiment.

Referring now to FIG. 1, a partial cross-section end view of the rotor assembly 2 and stand-pipe 4 within the vessel 6 of the most preferred embodiment will now be described. The rotor assembly 2 is connected to a shaft 8 and wherein the shaft 8 is disposed through the flange cover 10, and wherein the flange cover 10 is affixed to the internal portion of the vessel 6. The shaft 8 is spun by a motor means (not shown). As those of ordinary skill in the art will appreciate, the rotor assembly includes a member capable of rotation within a cylindrical housing so that during rotation, gas bubbles are produced. Rotor assemblies are commercially available from Petreco International Inc. under the name Wemco Depurator Rotor Assembly. A gas inlet port 12 for allowing the introduction of a gas into the vessel 6 via the standpipe 4 and rotor assembly 2 is also shown.

Figure 2:
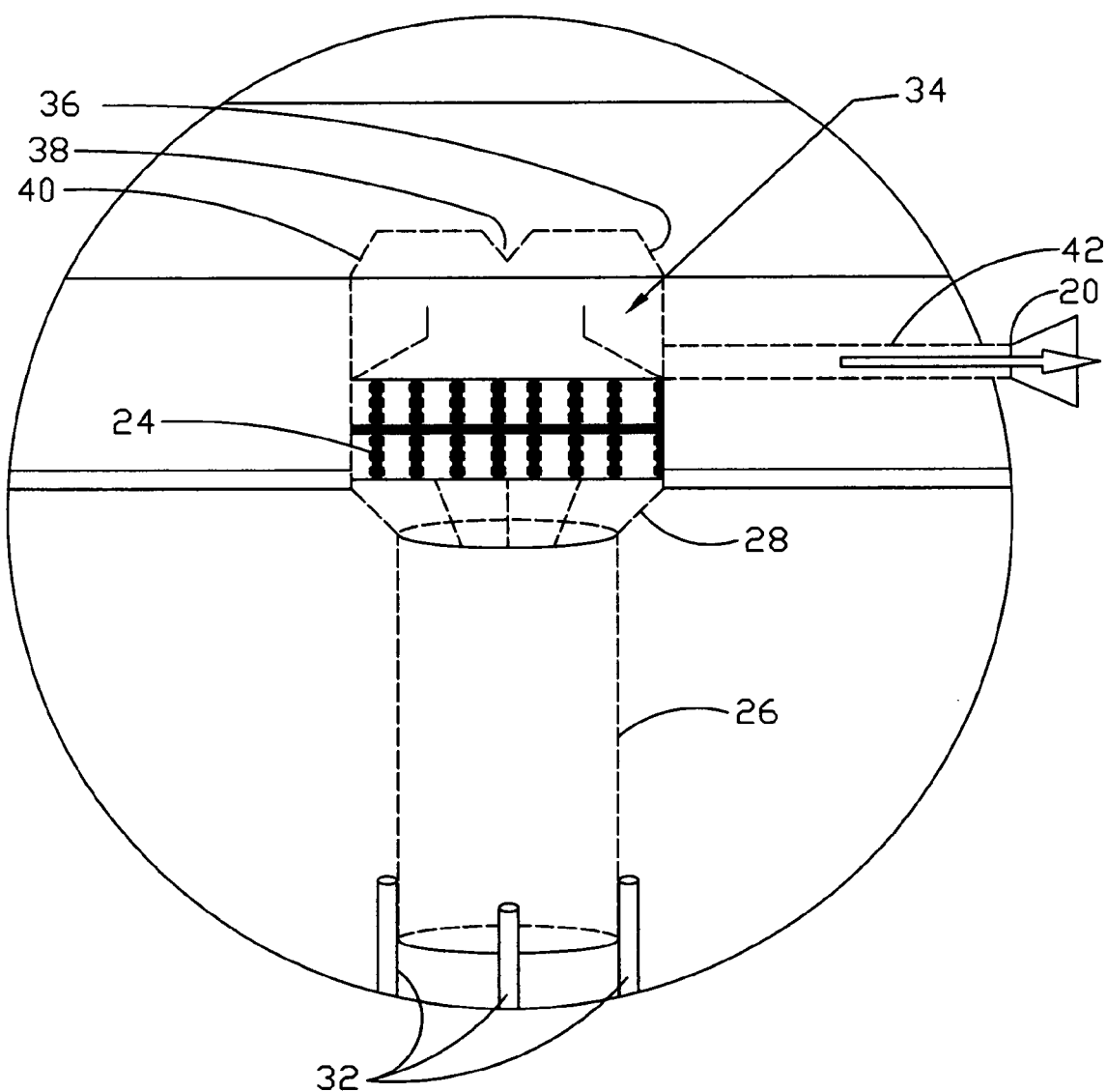
FIG. 2 is a partial cross-section end view of the disperser, draft tube and secondary skimmer within the vessel of the most preferred embodiment.

As seen in FIG. 1, the stand-pipe 4 comprises a first outer diameter portion 14 and a second outer diameter portion 16, and wherein the portion 14 is larger than the portion 16. The standpipe 4 is attached at one end to the flange cover 10 and at the second end is attached to the internal skim tray 18 (also referred to as aeration skim tray 18). As those of ordinary skill in the art will recognize, the rotor assembly 2 will generate a plurality of bubbles within the raw water which in turn will cause an oily froth to rise to the top of raw water volume within the vessel 6. FIG. 1 also depicts the internal skim tray 18, which forms part of the skimming means. As shown in FIG. 1, internal skim tray 18 has a saucier type of shape and is disposed about the secondary skimmer 34 (as illustrated in FIG. 2), which surrounds the standpipe 4 and the shaft 8 of the rotary assembly 2. A skim outlet 20 is also shown, and wherein the skimming means is fluidly connected to the skim outlet 20. The internal skim tray 18 will be attached to the sides of the vessel 6. In one preferred embodiment, the bottom of the internal skim tray 18 will have open ports 21a, 21b for the purpose of limited liquid communication between the internal skim tray 18 and the vessel 6. This feature prevents flooding of the internal skim tray 18 by allowing liquids at the bottom of the tray (mostly water) to re-enter the flotation process simultaneously as liquids at the top of the tray (mostly oil) are skimmed into the secondary skimmer 34.

Referring now to FIG. 2, a partial cross-section end view of the disperser mechanism 24 and draft tube 26 within the vessel 6 of the most preferred embodiment is shown. It should be noted that like numbers appearing in the various figures refer to like components. The disperser mechanism 24 is disposed about the rotor assembly 2 (not shown in this view). The disperser mechanism 24 disperses the plurality of bubbles created by the rotor assembly 2. The disperser mechanism 24 is a cylindrical cage assembly. The disperer mechanism 24 is connected to the draft tube centralizer 28 which in turn is connected to the draft tube 26. The draft tube 26 provides a passage for the raw water that is being drawn by the rotation of the rotary assembly 2, as will be more fully explained later in the disclosure.

The lower assembly support struts 32 are also shown. The purpose of the lower assembly support struts 32 is to support the secondary skimmer 34, disperser 24, draft tube centrailzer 28, and draft tube 26. FIG. 2 also depicts the secondary skimmer 34, wherein the secondary skimmer 34 is a rolled piece of metal (i.e. cylindrical) that has several overflow "V" notches (such as notches 36, 38, 40) formed thereon, wherein the skimmer 34 is placed within the skim tray 18 (not shown in FIG. 2). An outflow line 42 is in communication with the secondary skimmer 34, and wherein the outflow line 42 is also in communication with the skim outlet 20 for discharging the collected oily froth. It should be noted that the secondary skimmer 34 is placed within the internal skim tray 18, so that the oily froth overflows from the internal skim tray 18 and into the secondary skimmer 34. From the secondary skimmer 34, the oily froth exits via the out flow line 42.

Figure 3:
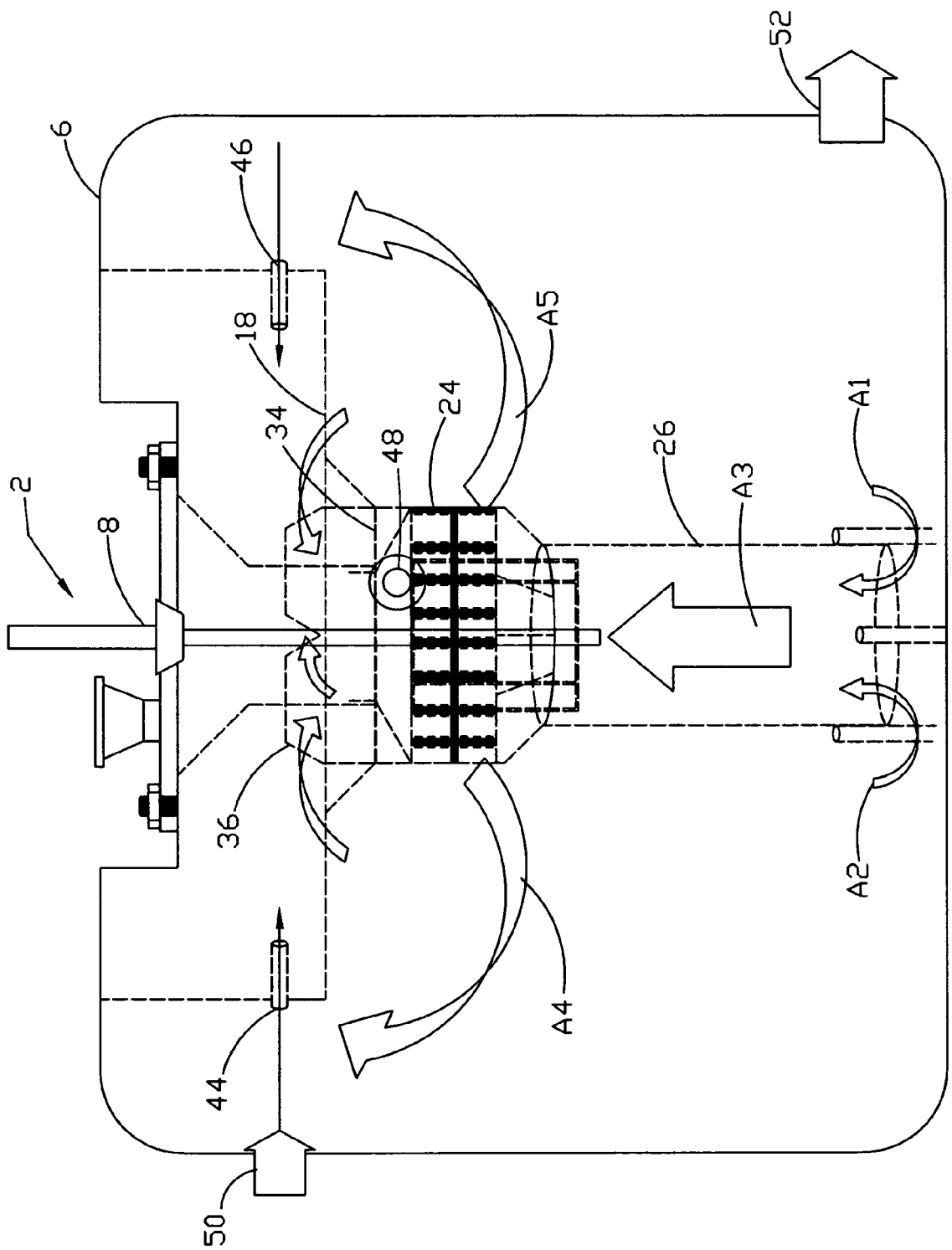
FIG. 3 is a partial cross-section side view of the vessel with the internal components of the most preferred embodiment.

Referring now to FIG. 3, a partial cross-section side view of the vessel 6 with the internal components of the most preferred embodiment. More specifically. FIG. 3 depicts the rotary assembly 2 connected to the shaft 8. The disperser mechanism 24 is disposed about the rotary assembly 2 and wherein the draft tube 26 is connected to the disperser mechanism 24, as previously noted. The internal skim tray 18 is disposed about the secondary skimmer 34.

The arrows A1, A2 represent the circulation path of the raw water that is being sucked into the draft tube 26 (as noted by arrow A3), which in turn will be drawn into the rotary assembly 2. The raw water will then be forced from the rotary assembly 2 thereby creating gas bubbles within the raw water, and through the disperser mechanism 24, as noted by flow arrows A4 and A5. From there, the generated gas bubbles will cause the oily froth to rise to the top, and wherein the oily froth will be directed into the internal skim tray as illustrated by skim tray inlet 44 and skim tray inlet 46. The oily froth will collect in the tray 18, and then into the secondary skimmer 34 for removal via the skim outlet nozzle 48. FIG. 3 further depicts the raw water inlet 50 for the introduction of the raw water into the vessel 6, as well as the skimmed water outlet 52. The skimmed water which exits at the water outlet 52 has had the oily froth removed as per the teachings of the present invention.

Figure 4:
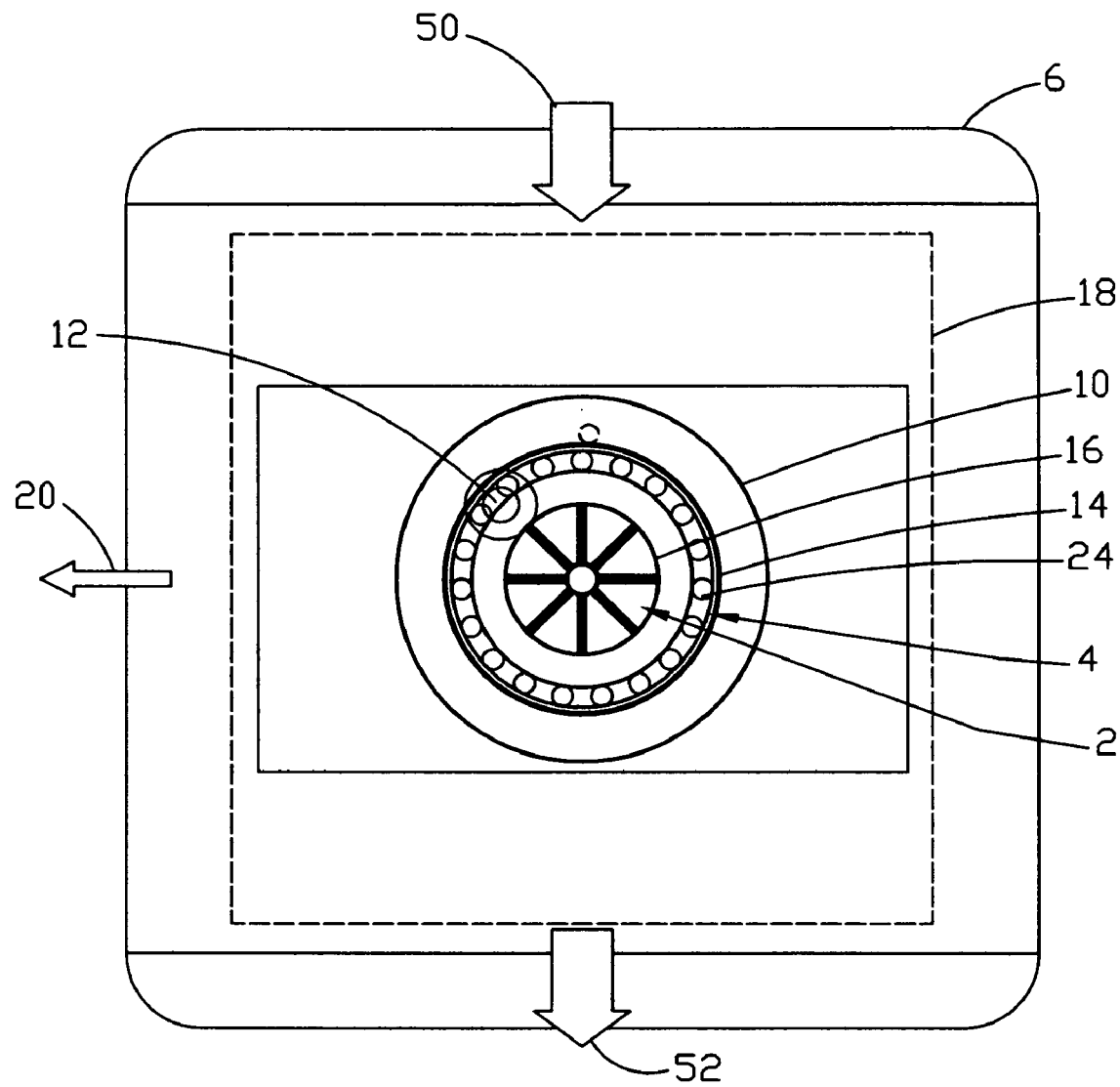
FIG. 4 is a partial top view of the vessel with internal components illustrated in FIG. 3.

Referring now to FIG. 4, a partial top view of the vessel 6 with internal components illustrated in FIG. 3 will now be described. The raw water inlet 50 is shown along with the clean water outlet 52 and skim (oily froth) outlet 20. The top view seen in FIG. 4 also depicts the outer limits of the internal skim tray 18. The internal skim tray 18 is secured to the side walls of the vessel 6. The contour of the flange cover 10 is shown. Also shown is the standpipe portion 16 that extends to the standpipe portion 14. The rotor assembly 2 is shown disposed within the disperser mechanism 24. In the most preferred embodiment, the rotor assembly 2 and standpipe 4 are mounted to the flange cover 10 that bolts to the top of the vessel 6. The disperser mechanism 24, draft tube 26 (not seen in this view), and secondary skimmer 34 (not seen in this view) are all built as a single piece for installation through the flange cover 10. The gas induction nozzle 12 allows the entry of gas from the external skim tank (not seen in this view).

Figure 5:
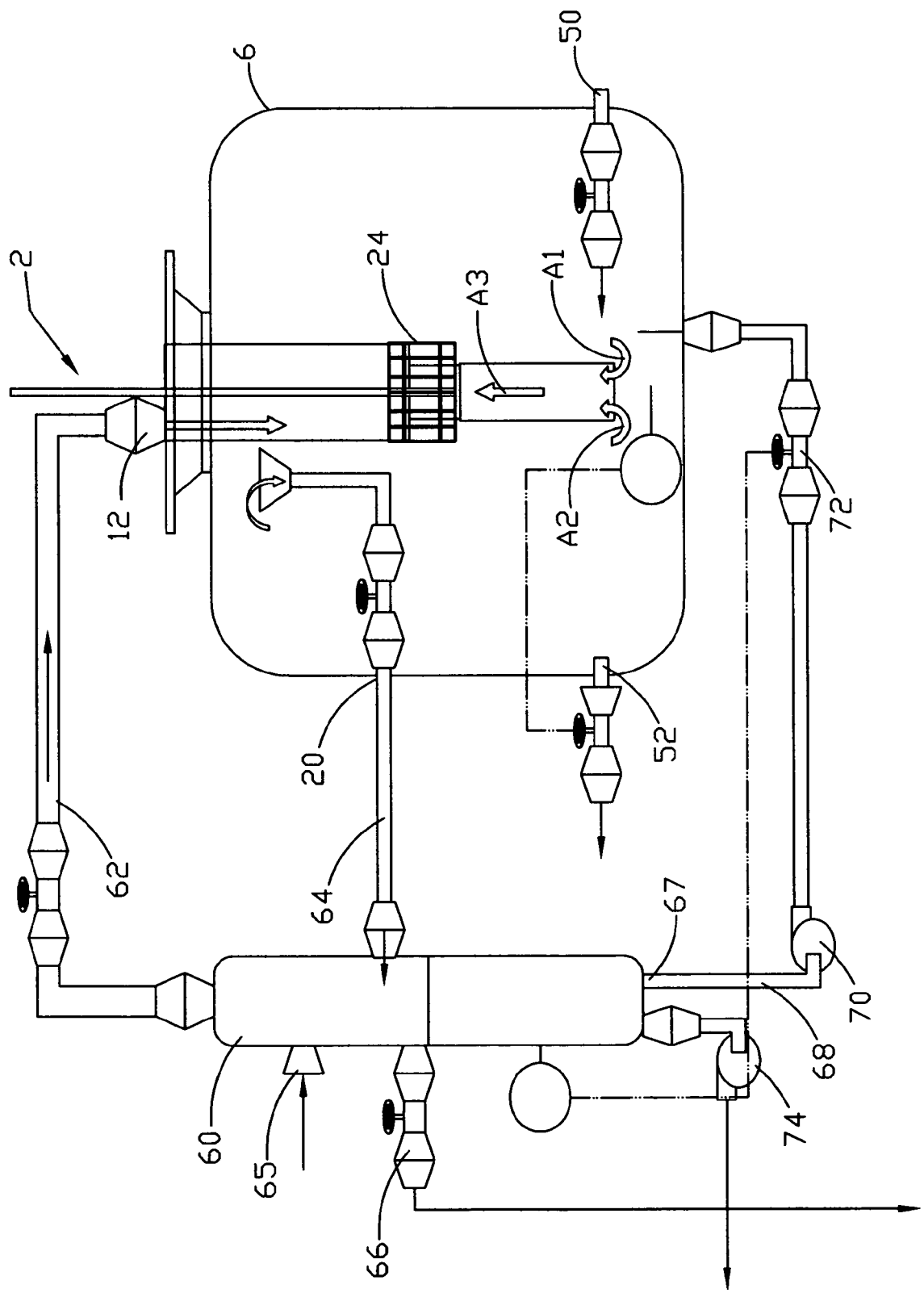
FIG. 5 is a schematic illustration of a second preferred embodiment of a vessel operatively associated with an external skim tank.

FIG. 5 is a schematic illustration of a second preferred embodiment of the vessel 6 operatively associated with an external skim tank 60. The schematic of FIG. 5 depicts the rotary assembly 2 and the disperser mechanism 24 disposed within the vessel 6 as previously described. The raw water inlet 50 and the skimmed water outlet 52 are shown. The flow arrows A1, A2, and A3 are included, as previously described.

The external skim tank 60 has a gas induction return line 62 that is connected to the gas inlet port 12. Hence, gas is drafted into the rotor assembly 2 from the external skim tank 60 via gas induction return line 62. Additionally, the skim outlet 20 is directed via outlet skim line 64 to the external skim tank 60. Besides allowing for a gas circulation path, the closed loop of gas circulation keeps outlet skim line 64 clean of the oily froth, which is a feature of the present invention. Make-up gas enters the system through the external skim tank 60 via the make-up gas line 65. Make-up gas is delivered to the system via line 65 from an external gas source such as natural blanket gas available on the platform or an alternate blanket gas source. As per the teachings of this disclosure, make-up gas can be carbon dioxide ($CO_2$), wherein the $CO_2$ is added for Ph adjustment to release water soluble organics for removal via the flotation process to the content of the external skim tank 60.

A skim intermittently means 66 for intermittently skimming the oily froth within the external skim tank 60 is also shown. One embodiment of the skim intermittently means 66 consist of controllers and timers that remove oil from the surface of the tank and water 67 from the bottom of the tank. FIG. 5 depicts a water outlet 67 and associated outlet line 68 which directs the water phase component from within the external skim tank 60 to the vessel 6. The outlet line 68 has operatively associated therewith the pump means 70 as well as the valve means 72 for directing the water back to the vessel 6. As an alternative, the water from the external skim tank 60 may also be directed to the pump means 74, and wherein for this configuration, the operator may wish to perform additional separation with different types of separation techniques on the water, or the operator may simply discharge the water in the event that the operator feels that the water has been treated adequately.

Figure 6:
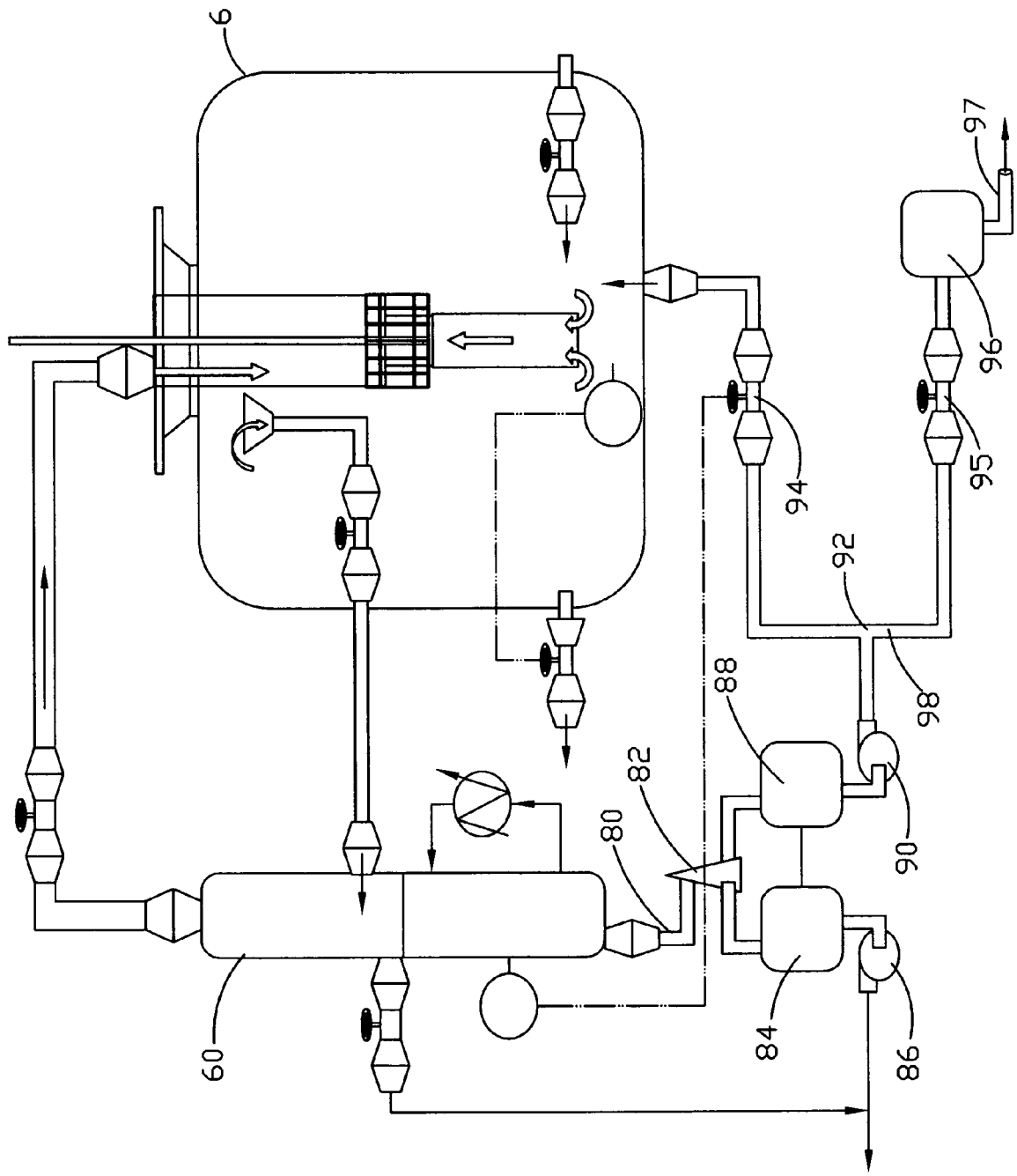
FIG. 6 is a schematic illustration of a third preferred embodiment of the vessel operatively associated with an external skim tank and other components.

Referring now to FIG. 6, a schematic illustration of the third preferred embodiment of the vessel 6 operatively associated with an external skim tank 60 and other components will now be described. The liquid component from the external skim tank 60 will be directed to the outlet line 80 which in turn is delivered to the centrifugal separator means 82 for separating the liquid output into a water component and into a oil component. The oil component is delivered to the oil tank 84, and wherein the pump means 86 may be further included in order to pump the oil component to other appropriate holding tanks (not shown).

FIG. 6 also shows where the water component exiting the centrifugal separator 82 is directed to a water tank 88. A pump means 90 is fluidly connected to the water tank 88 so that the water component can be pumped and delivered to the vessel 6 so that the water component can be subjected to the separation system within the vessel 6, as previously described. The water component from the pump means 90 is feed into line 92, and wherein a valve means 94 is included in line 92 to direct the water to the vessel 6. The operation of the vessel 6 and external skim tank 60 is the same as previously presented. In this embodiment, it is also possible to include a divert line 98 and valve 95 to additional separation devices 96 such as nutshell filters, sock filters, granular activated carbon filters 96, diatomaceous earth filters, and other equivalent separation means. The additional separation device(s) 96 will discharge clean water through discharge line 97 to overboard or other suitable disposal means (not shown).

While the present techniques of the invention may be susceptible to various modifications and alternative forms, the exemplary embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

We claim:
1. An apparatus for treating raw water comprising:
a vessel having an inlet for the raw water and an outlet for a skimmed water, said vessel containing the raw water;
a rotor mechanism for creating a plurality of gas bubbles within the raw water;
a disperser means, operatively associated with the rotor mechanism, for dispersing the plurality of gas bubbles from the rotor mechanism within the vessel, and wherein said gas bubbles create an oily froth on the top of the raw water;

an outflow line for the pneumatic removal of the oily froth from the top of the raw water during a skimming process;

an external skim tank, wherein said external skim tank is configured to deliver a gas to said rotor mechanism and wherein said external skim tank and said outflow line are in fluid communication with said external skim tank receiving the oily froth from the vessel; and a closed loop gas line for communicating said gas from said external skim tank to said vessel and from said vessel, together with said oily froth, back to said external skim tank through said outflow line.

2. The apparatus of claim 1 further comprising a centrifugal pump for separating a hydrocarbon component and a water component from the oily froth within said external skim tank, and wherein said water component from said centrifugal pump is directed to said vessel.

3. The apparatus of claim 2 further comprising an internal heat exchange circulation loop operatively associated with said external skim tank so that heat is added to the oily froth.

4. The apparatus of claim 1 wherein said disperser means comprises:
   a disperser mechanism concentrically disposed about the rotor mechanism;
   a draft tube assembly operatively connected to said disperser mechanism, said draft tube assembly providing a path for the raw water into the disperser mechanism.

5. The apparatus of claim 4 further comprising an aeration skim tray positioned above said rotor mechanism.

6. The apparatus of claim 5 further comprising a secondary oil skimming device positioned within said aeration skim tray and configured to direct the oily froth from the vessel, through said outflow line, to said external skim tank.

7. The apparatus of claim 6 wherein the rotor mechanism includes a shaft concentrically disposed within a standing pipe, said standing pipe being attached to an internal portion of the vessel.

8. The apparatus of claim 6 wherein said secondary oil skimming device comprises a cylindrical member with notches at a top end, and wherein said oily froth is directed over said notches and into an internal portion of said cylindrical member.

* * * * *